United States Patent [19]

Satou et al.

[11] Patent Number: 5,508,779

[45] Date of Patent: Apr. 16, 1996

[54] AUTO-BRACKETING SYSTEM

[75] Inventors: Osamu Satou; Isamu Hirai, both of Tokyo; Masahiro Nakata, Fujimi, all of Japan

[73] Assignee: Asahi Kogaku Kogyo Kabushiki Kaisha, Tokyo, Japan

[21] Appl. No.: 358,970

[22] Filed: Dec. 19, 1994

Related U.S. Application Data

[63] Continuation of Ser. No. 869,204, Apr. 13, 1992, abandoned, which is a continuation of Ser. No. 663,057, Feb. 27, 1991, abandoned, which is a continuation of Ser. No. 363,935, Jun. 8, 1989, abandoned.

[30] Foreign Application Priority Data

Jun. 8, 1988 [JP] Japan ................... 63-141371

[51] Int. Cl.⁶ ................................... G03B 7/00
[52] U.S. Cl. ................... 354/410; 354/412; 354/432
[58] Field of Search .................... 354/410, 412, 354/429, 430, 432, 433, 434, 442, 266

[56] References Cited

U.S. PATENT DOCUMENTS

| | | | |
|---|---|---|---|
| 3,545,350 | 12/1970 | Gross. | |
| 3,945,732 | 3/1976 | Nobusawa | 354/432 |
| 3,971,046 | 7/1976 | Nobusawa | 354/425 |
| 3,994,595 | 11/1976 | Nobusawa | 354/432 |
| 4,395,099 | 7/1983 | Terasita | 354/430 |
| 4,476,383 | 10/1984 | Fukuhara et al. | 354/432 |

(List continued on next page.)

FOREIGN PATENT DOCUMENTS

| | | |
|---|---|---|
| 2116835 | 9/1979 | Germany. |
| 54-26893 | 9/1979 | Japan. |
| 55-40480 | 3/1980 | Japan. |
| 61-148437 | 7/1986 | Japan. |
| 61-167934 | 7/1986 | Japan. |
| 63-37328 | 2/1988 | Japan. |
| 63-37330 | 2/1988 | Japan. |
| 63-37333 | 2/1988 | Japan. |
| 63-37320 | 2/1988 | Japan. |
| 63-37321 | 2/1988 | Japan. |
| 63-37322 | 2/1988 | Japan. |
| 63-37324 | 2/1988 | Japan. |
| 63-37325 | 2/1988 | Japan. |
| 63-37329 | 2/1988 | Japan. |
| 63-37331 | 2/1988 | Japan. |
| 63-37332 | 2/1988 | Japan. |
| 63-37334 | 2/1988 | Japan. |
| 63-37327 | 2/1988 | Japan. |
| 63-37323 | 2/1988 | Japan. |
| 63-37326 | 2/1988 | Japan. |

OTHER PUBLICATIONS

"Fastness Is No Witchcraft", INPHO magazine, pp. 12 and 13, Oct. 1988 (May 15, 1988).
Search Report.
English Language Abstract of Japanese Patent No. 55-40480.
English Language Abstract of Japanese Patent No. 61-148437.
English Language Abstract of Japanese Patent No. 63-37320.
English Language Abstract of Japanese Patent No. 63-3732.
English Language Abstract of Japanese Patent No. 63-37322.
English Language Abstract of Japanese Patent No. 63-37323.
English Language Abstract of Japanese Patent No. 63-37324.
English Language Abstract of Japanese Patent No. 63-37325.

*Primary Examiner*—Russell E. Adams
*Attorney, Agent, or Firm*—Greenblum & Bernstein

[57] ABSTRACT

An auto-bracketing system for use with a camera. A plurality of exposure values, representing different exposure conditions, are calculated. The plurality of exposure values are calculated in accordance with at least two brightness values metered by optical sensors associated with the camera. A plurality of film frames, of a film installed in the camera, are subsequently exposed to the different exposure conditions.

35 Claims, 12 Drawing Sheets

U.S. PATENT DOCUMENTS

| | | | |
|---|---|---|---|
| 4,529,288 | 7/1985 | Nakai et al. | 354/442 |
| 4,734,727 | 3/1988 | Takemae | 354/412 |
| 4,745,427 | 5/1988 | Izumi et al. | 354/432 |
| 4,746,947 | 5/1988 | Nakai | 354/432 |
| 4,748,468 | 5/1988 | Fujino et al. | 354/432 |
| 4,812,870 | 3/1989 | Kawamura | 354/412 |
| 4,862,205 | 8/1989 | Kawamura | 354/412 |
| 4,914,466 | 4/1990 | Wakabayashi et al. | 354/412 |
| 5,099,267 | 3/1992 | Satou et al. | 354/412 |

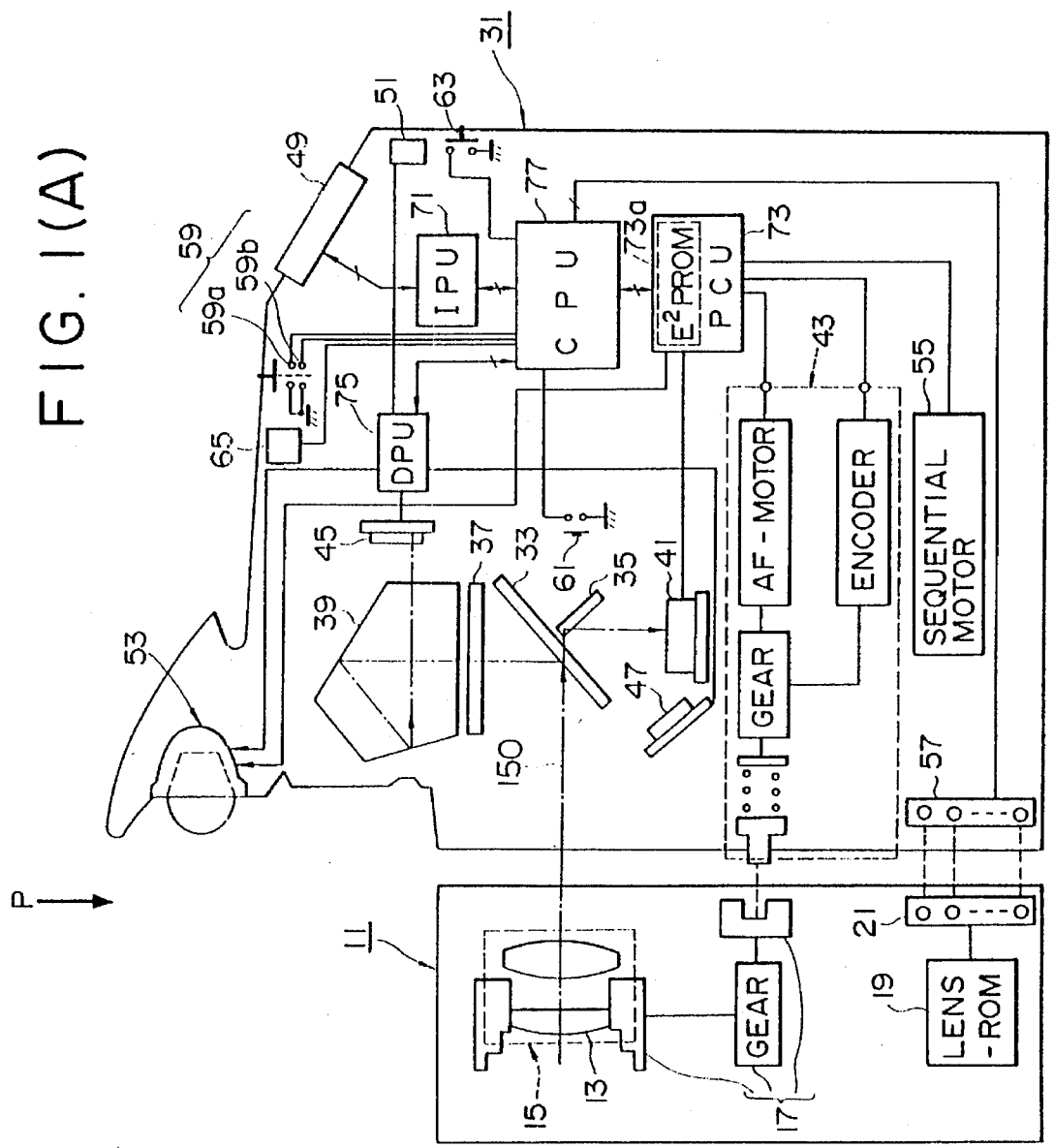
FIG. I(A)

FIG. I(B)
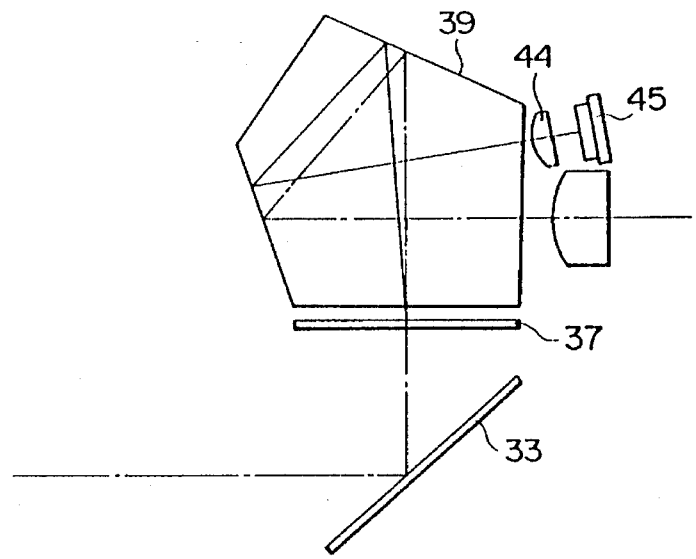
FIG. I(C)
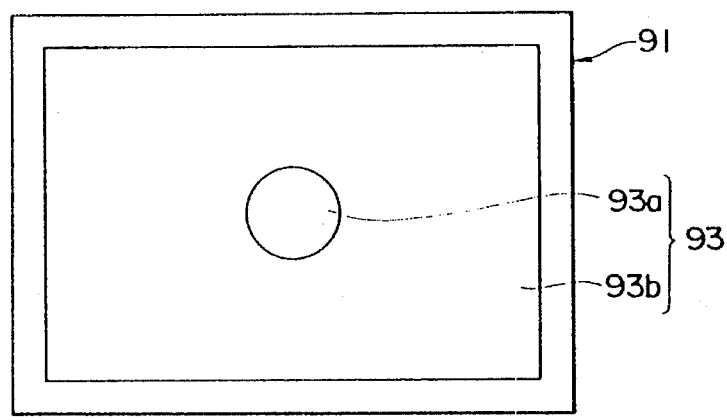
FIG. I(D)
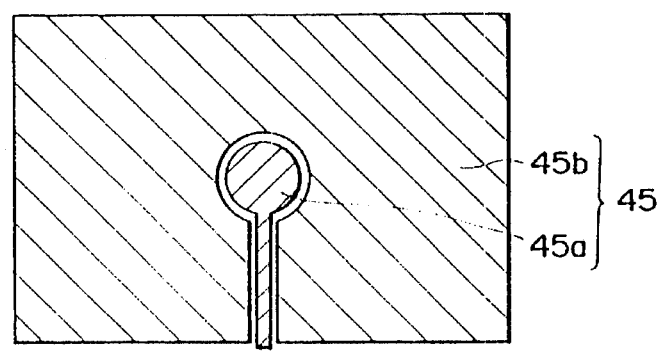

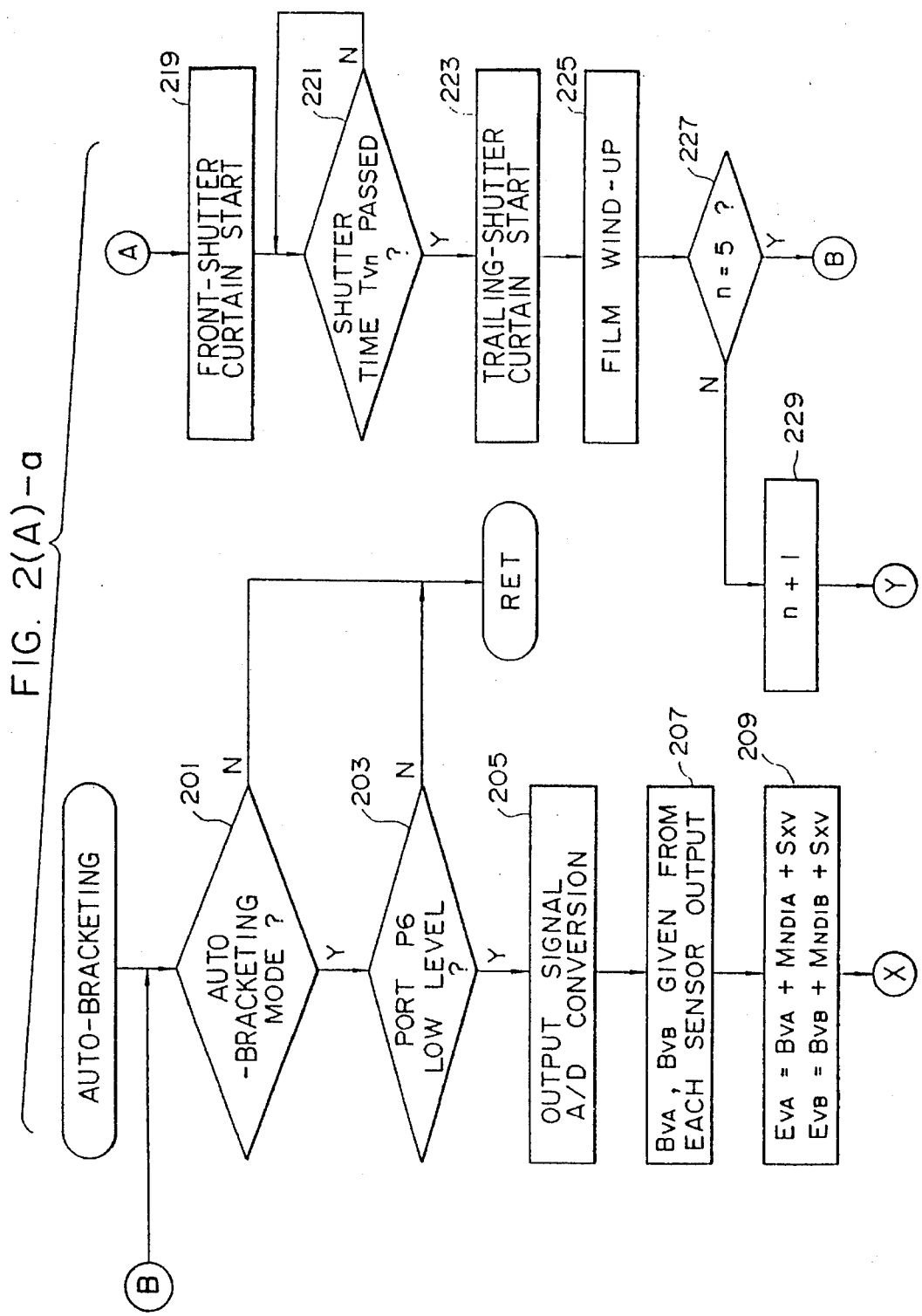
FIG. 2(A)-a

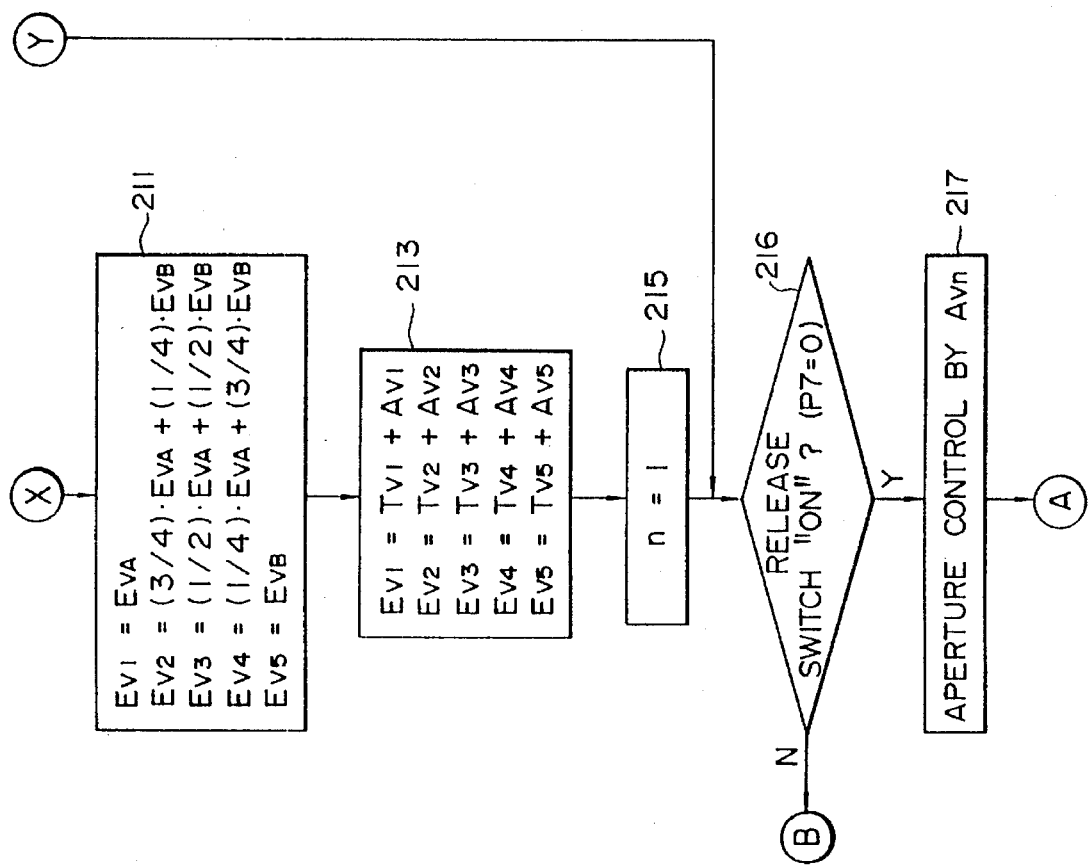

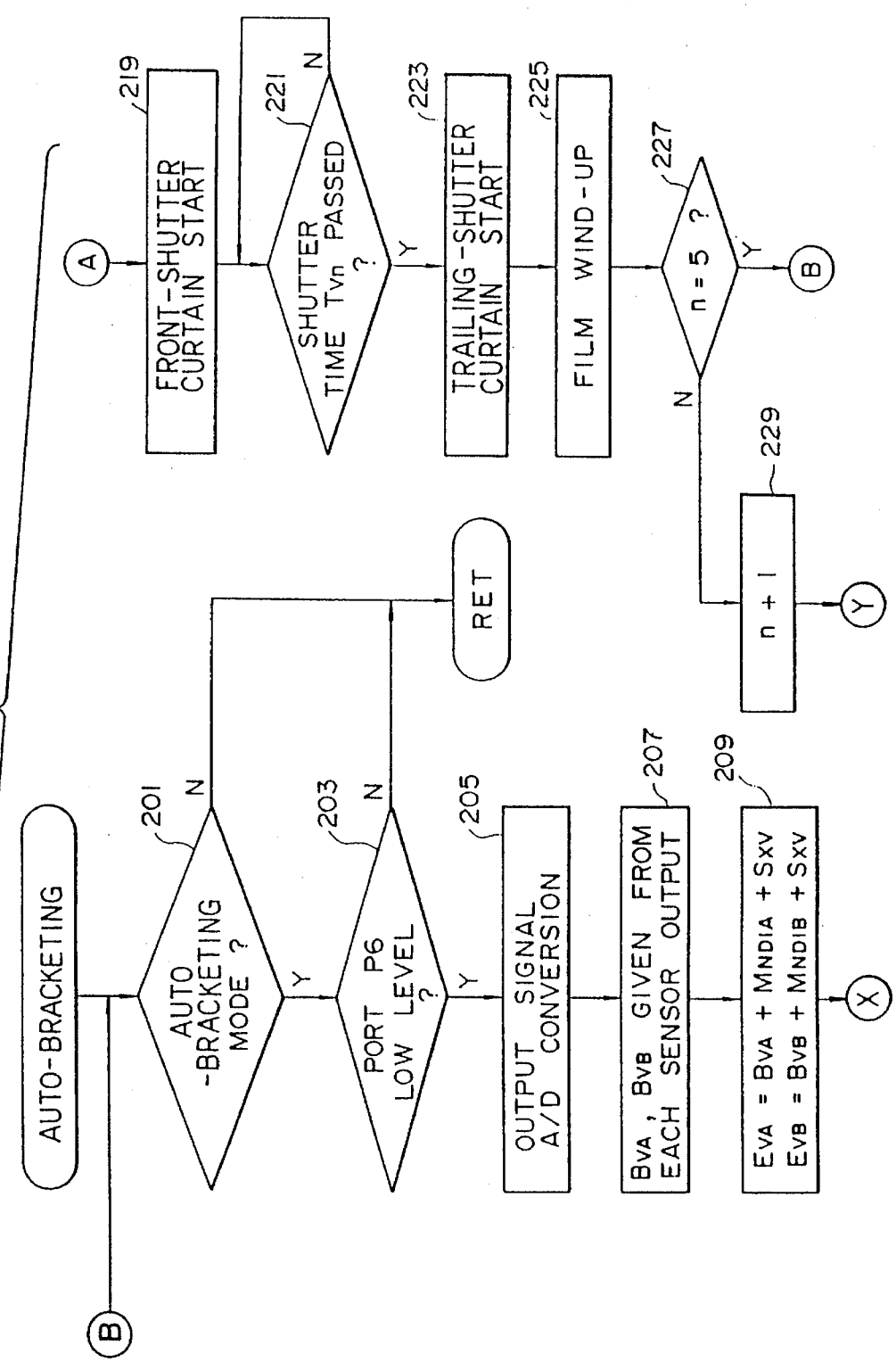

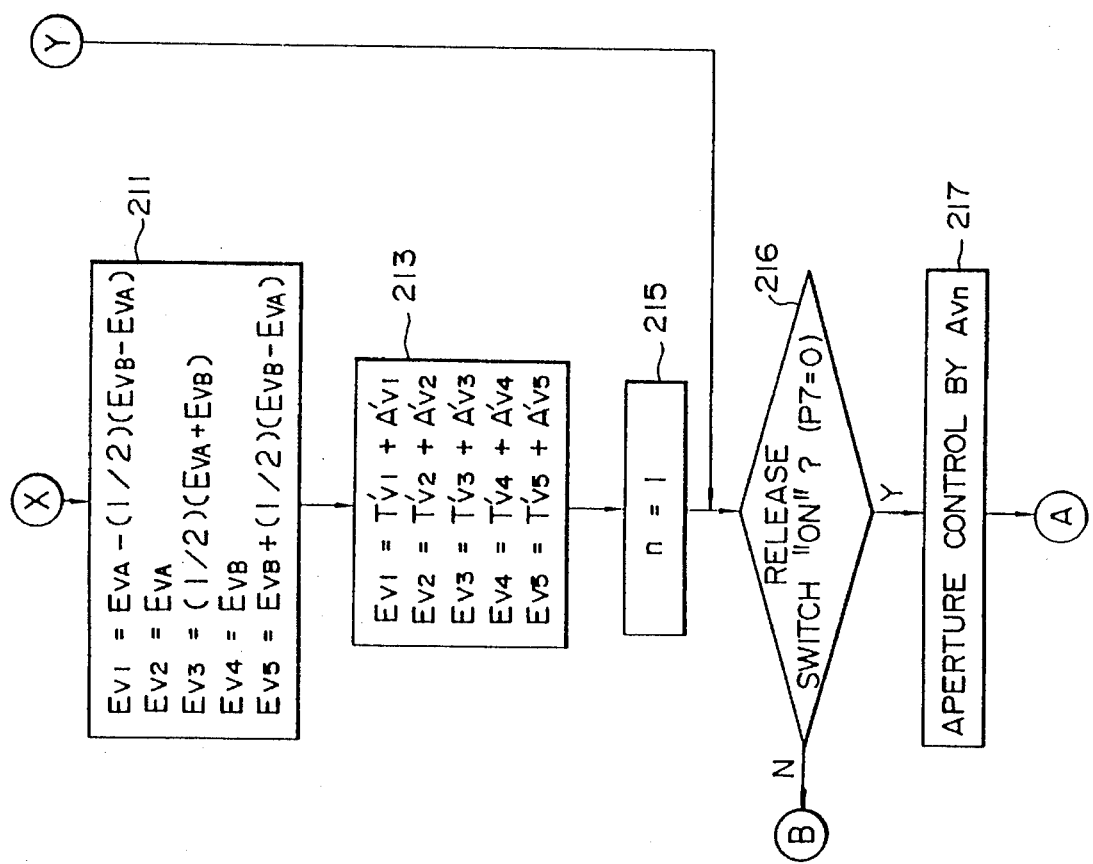

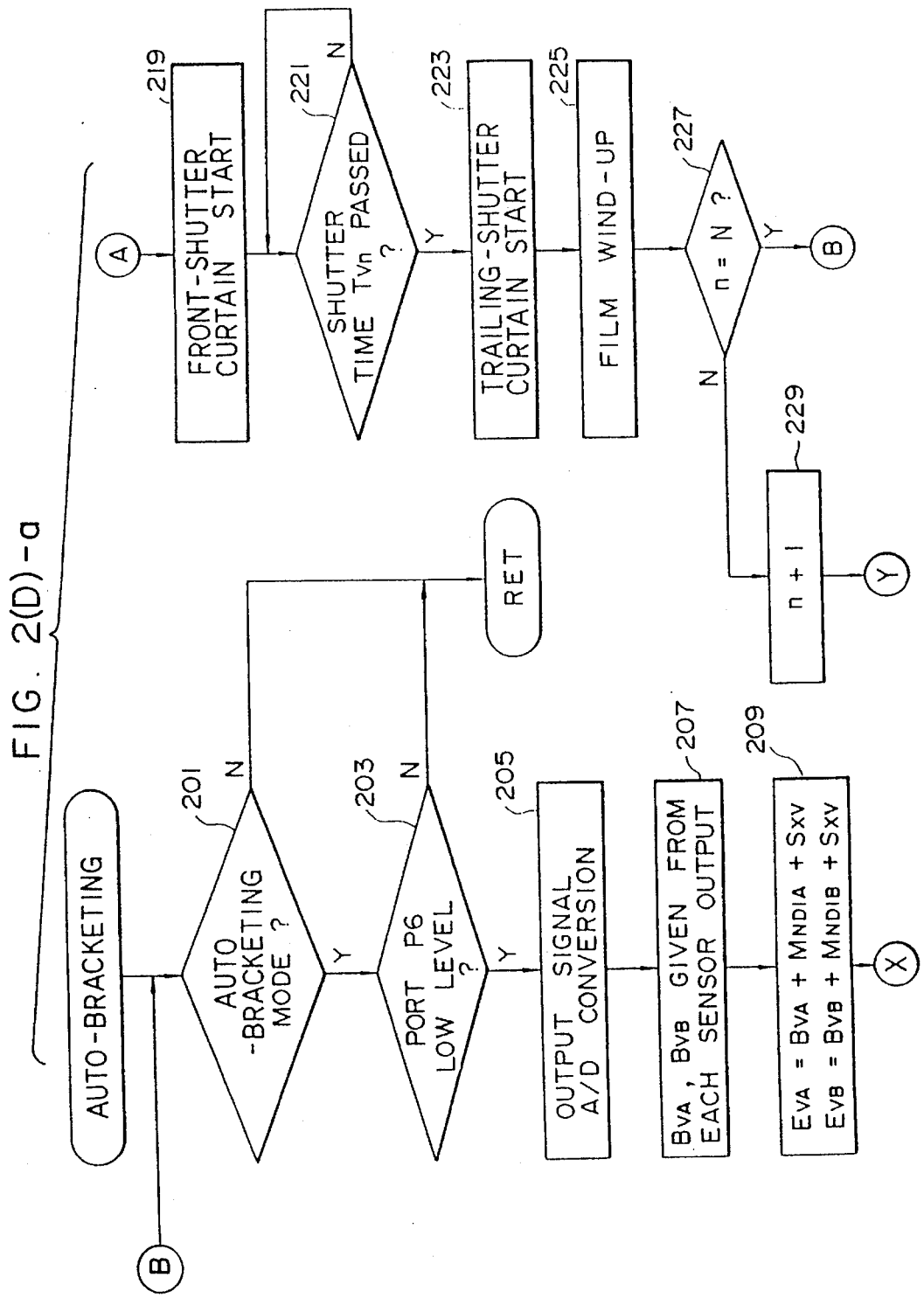
FIG. 2(D)-a

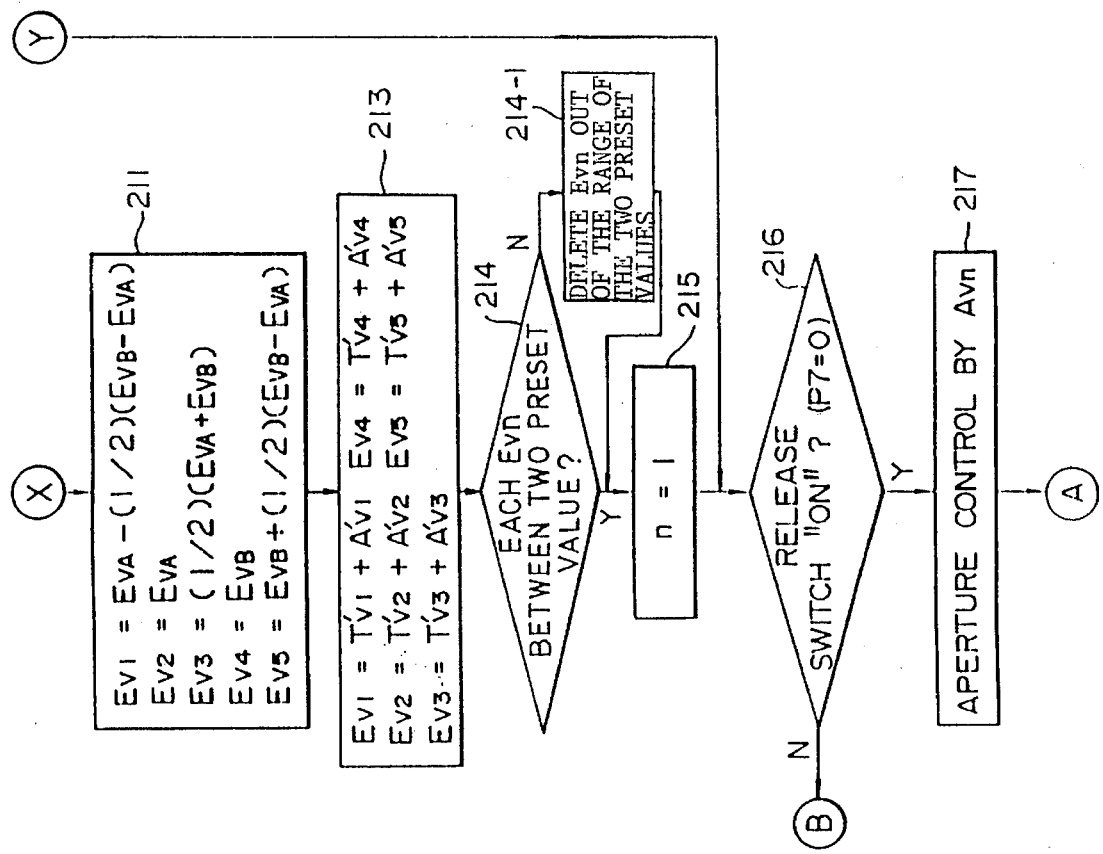

AUTO-BRACKETING SYSTEM

This is a continuation of application Ser. No. 07/869,204, filed Apr. 13, 1992, now abandoned, which is a continuation of application Ser. No. 07/663,057, filed Feb. 27, 1991, now abandoned, which is a continuation of application Ser. No. 07/363,935, filed Jun. 8, 1989, now abandoned.

BACKGROUND OF THE INVENTION

This invention relates to an auto-bracketing system for exposure variations to be provided on a camera capable of executing consecutive advance photographing based upon the results of multi-area (i.e., multi-section) metering, and more particularly to an auto-bracketing system with which exposure conditions for individual frames of a film during consecutive advance photographing can be made different from each other in accordance with the subject's brightness as determined by the multi-area (multi-section) metering.

Cameras are generally provided with photometers to provide an optimum exposure value Ev dependent upon the brightness of a subject which is required for exposure control. There are various types of such photometers possible, of which a multi-area (multi-section) metering system utilizing a plurality of optical sensors for photomerry is considered as desirable since it is capable of measuring the brightness of a subject accurately.

Also, recent cameras have been equipped with a motor built in the camera body to automatically wind the film and further to make it possible to consecutively photograph the same subject on a series of multiple frames by winding the; film with this motor. Some of such cameras capable of executing the consecutive advance photographing are further capable of photographing individual frames in different exposure conditions to provide a plurality of pictures slightly different from each other in their exposure conditions. Disclosed in Japanese Patent Provisional Publication SH061-148437 is one of such cameras, in which auto-bracketing is accomplished by feeding an estimated correction value to an exposure control unit every time an exposure operation for one frame is finished, and in which a predetermined number can be preset so that a photographing operation, including a series of exposure operations is finished when the preset number of frames are respectively exposed.

However, in the system disclosed in Japanese Patent Provisional Publication SH061-148437 and in other similar conventional systems, it is only possible to execute auto-bracketing in a plurality of exposure values determined by the addition of an estimated correction value to the optimum exposure value given by the multi-area (i.e., multi-section) metering. There are no systems which execute auto-bracketing during consecutive advance photographing, in a plurality of exposure conditions which are determined in dependence upon the brightness which have been sensed by a plurality of sensors built into a photometer.

SUMMARY OF THE INVENTION

It is therefore an object of the invention to provide an improved auto-bracketing system with which exposure conditions for individual frames during consecutive advance photographing can be made different from each other, in accordance with tile brightness given by a plurality of sensors.

For this purpose, according to the invention, an auto-bracketing system is provided for exposure variations, in a camera having a light measuring circuit including a plurality of sensors. The system comprises an exposure value calculating means for calculating a plurality of exposure values in accordance with at least two brightnesses metered by said light measuring circuit; and an exposure means for exposing a film installed in said camera in accordance with exposure conditions corresponding to the exposure values calculated by the exposure value calculating means.

DESCRIPTION OF THE ACCOMPANYING DRAWINGS

FIG. 1(A) is a block diagram schematically showing a camera adapted to incorporate the auto-bracketing system embodying the present invention;

FIG. 1(B) is a schematic view showing a pentagonal prism and a photocell employed in tile camera of FIG. 1(A);

FIG. 1(C) is a plan view showing the relationship between a photographing area and a photometric area;

FIG. 1(D) is a plan view showing a configuration of the photocell of FIG. 1(B);

Figure 2B:
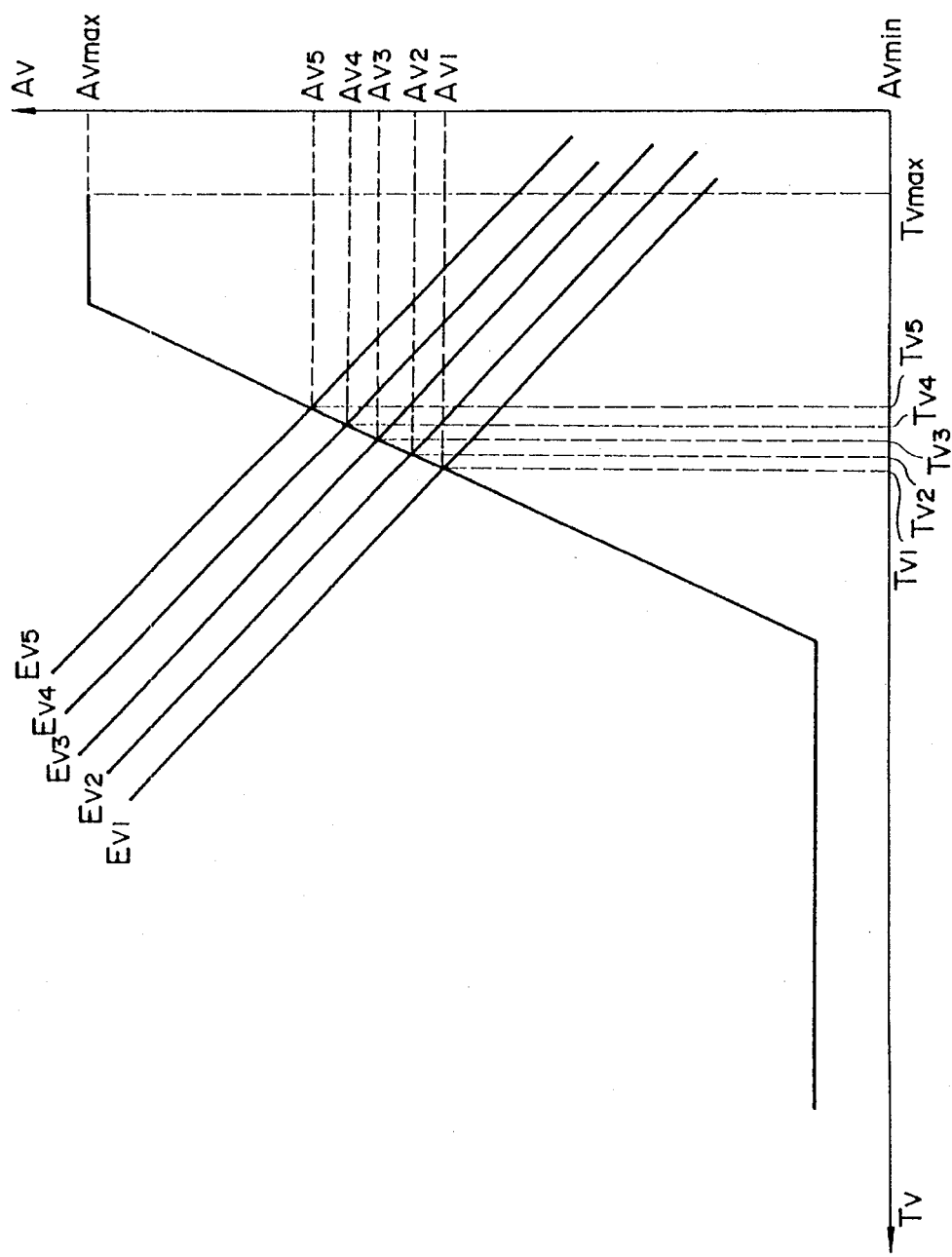

FIG. 2(A) (a and b) are flowcharts for calculating a plurality of exposure values and successively exposing film in the presence of exposure conditions based upon the calculated exposure values;

FIG. 2(B) is a program diagram representing the relationship between the exposure values and the exposure conditions; and FIG. 2(C) (a and b) and (D) (a and b) are flowcharts of another examples for calculating exposure values and successively exposing based upon the calculated exposure values, with FIGS. 2(A)(a) and 2(C)(a) being identical.

DESCRIPTION OF THE EMBODIMENTS

FIG. 1(A) is a block diagram of an auto-focusing (AF) camera incorporating an auto-bracketing system embodying the present invention, with interchangeable lenses and two sensors serving for multi-area metering (i.e. the divided area brightness measuring).

Figure 1E:
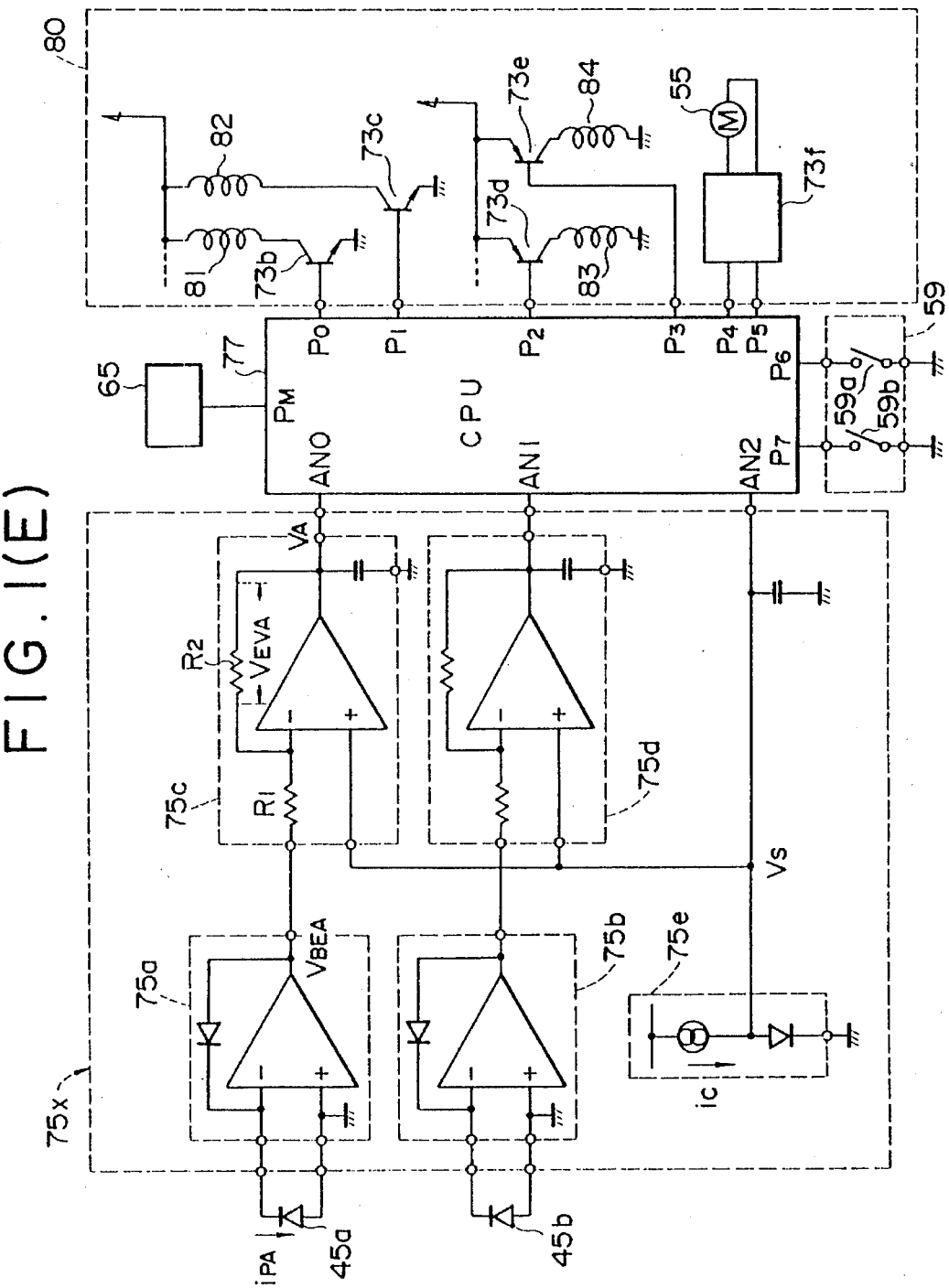
FIG. 1(E) is a circuit diagram of a light measuring circuit and a consecutive advance photographing control circuit.

An embodiment of the present invention will be described later with respect to the camera shown in FIG. 1 (A), 1. Description of the Structure of the Camera 1. Description of the General Camera Structure The general description of the camera shown in FIG. 1(A) is now described with reference to the drawings FIG. 1(A) through (G). The drawings are all schematic representations given as far as required for understanding of the embodiment of the present invention. It is apparent that the dimensions, geometries and positional relationships of structural components are not limited to those shown in the drawings. Like and similar components are indicated by like reference numerals throughout the drawings.

FIG. 1(A) is a block diagram schematically showing the camera. In FIG. 1(A), a taking lens 11 is adapted to be mounted on a camera body 31. The taking lens 11 is provided with a lens assembly 15, including a lens 13 being movable along an optical axis 150 and which is used for focusing purposes and a drive transmission mechanism 17 for transmitting driving power from a drive unit, including drive mechanism 43 provided on the side of the camera body 31, to movable lens 13. The taking lens 11 is further provided with a lens-ROM (Read Only Memory) 19 storing aperture data, focal length data, and data relating to the photographing distance from a subject to be photographed, which depends upon the position of the movable lens 13, and a group of electric contacts 21 on the side of the lens 11 for electrical connection between the taking lens 11 and the camera body 31.

On the other hand, the camera body 31 consists of an optical system including a main mirror 33, a sub mirror 35, a focus plate 37, and a pentagonal prism 39, a focus-detecting unit 41 serving for auto focusing, a drive mechanism 43 for driving movement of the movable lens 13 in the taking lens 11, a photocell 45 for AE(Automatic Exposure) control, another photocell 47 serving for, TTL(Through the Lens) adjustment when using a strobe, a concentrated indicator unit 49 showing a plurality of states of the camera, a finder indicator 51 showing AE and AF settings, a built-in strobe 53, a sequential motor 55 for winding and rewinding a film, a group of electric contacts 57 on the side of the camera body 31 corresponding to the lens-side electric contacts 21, a shutter button 59, an X-contact 61, for instance, as a synchronous contact, a memory lock button 63 for locking an exposure value in its "ON" position, and an operating unit 65 being operated to control signals for changing ISO(International Standardization Organization) values of film speed, exposure correction values, exposure control modes of the camera and drive modes. The shutter button 59 according to this embodiment includes a two-stage switch in which the first-stage switch 59a is turned on in case that it is halfway pressed down and the second-stage switch 59b is turned on in case it is fully pressed down.

The camera body 31 further incorporates an IPU(Indication Processing Unit) 71 as a microprocessor for controlling the representation of the concentrated indicator unit 49, a PCU(Power Control Unit) 73 having an E$^2$ PROM(Electrical Eraseable/Programmable Read Only Memory) 73a for controlling the focus detecting unit 41, the sequential motor 55 and an AF(Auto-Focusing) motor as well as an aperture and a shutter release magnet, a DCU(Data Processing Unit) 75 as a microprocessor for controlling a light measuring processing and the finder indicator 51 and a CPU(Central Processing Unit) 77 as a microprocessor for totally controlling operations of the camera. The CPU 77 controls the IPU 71, the PCU 73, the DPU 75 and lens-ROM 19 In the taking lens 11.

Description of the Major Parts

Among the components In the camera configuration shown in FIG. 1(A), those pertaining to the auto-bracketing system according to the invention will be particularly described below.

(i) Sensors for the multi-area (multi-section) metering

A plurality of sensors for the multi-area (multi-section) metering are to be described with reference to FIG. 1(B)through(D). FIG. 1(B) is a schematic view showing the pentagonal prism 39 and the photocell 45 and the positional relationship of them. FIG. 1(C) is a plan view showing a relationship between a photographing area 91 and a photometric area 93. FIG. 1(D) is a plan view showing a configuration of the photocell 45. As shown in FIG. 1(B), a predetermined part of the coming light from the focus plate 37 is passed through a meter condenser lens 44 to generate an image on the photocell 45. Furthermore, as shown in FIG. 1(C), the light intensity in the photographing area indicated by 91 is measured within the photometric area which is somewhat smaller than the photographing area indicated by 93. The photometric area 93 is divided into a central zone 93a including the center of the photographing area 91 and a peripheral zone 93b surrounding the central zone 93a, these two zones each being respectively subject to each photometric processing. Therefore, the photocell 45 is thus configured to have a first sensor 45a corresponding to the central zone 93a and a second sensor 45b corresponding to the peripheral zone 93b, as shown in FIG. 1(D).

(ii) Signal processing circuit for sensor output signal and controlling circuit for consecutive advance photographing operation FIG. 1(E) is a circuit diagram illustrating a signal processing circuit for reading, the data transmitted from the sensor 45 and determining a plurality of brightness values.

In the drawing FIG. 1(E), numeral 75X indicates the signal processing circuit incorporated in the DPU 75 according to this embodiment. The circuit 75X consists of the components to be described below. Designated by numeral 75a is the first logarithm compression circuit for the first sensor 45a and 75b is the second logarithm compression circuit for the second sensor 45b. Numeral 75c and 75d respectively indicates an amplifier circuit for amplifying the output signal frown the logarithm compression circuits 75a and 75b. Indicated by numeral 75e is a reference voltage generator for generating the reference voltage Vs. The output signal from the amplifier circuit 75c for the first sensor 45a is fed to the AN0 port of the CPU 77, while the output signal from the amplifier circuit 75d for the second sensor 45b is fed to the AN1 port of the CPU 77 and the reference voltage Vs from the reference voltage generator 75e is fed to the AN2 port of the CPU 77. The signals received by the port AN0, AN1 and AN2 are subjected to A/D conversion by means of an well-known A/D converter not shown, in the CPU 77.

Further, in FIG. 1(E), numeral 80 indicates a circuit for the consecutive advance photographing operation. The circuit 80 is provided with the circuit elements described below. Numeral 73b through 73e indicate transistors for turning on and off solenoid relays described later, and 73f indicates a motor drive circuit for driving the sequential motor to wind-up the film. In this embodiment, the components 73b through 73f are incorporated in PCU 73 and are electrically connected to the corresponding ports of the CPU 77. Numeral 81 indicates a magnet coil for controlling a front-shutter curtain, and 82 indicates another magnet coil for controlling a trailing-shutter curtain. Further, numeral 83 indicates a release magnet coil for starting a release operation, and 84 indicates an EE magnet coil for controlling an aperture.

(iii) Operating unit

Figure 1F:
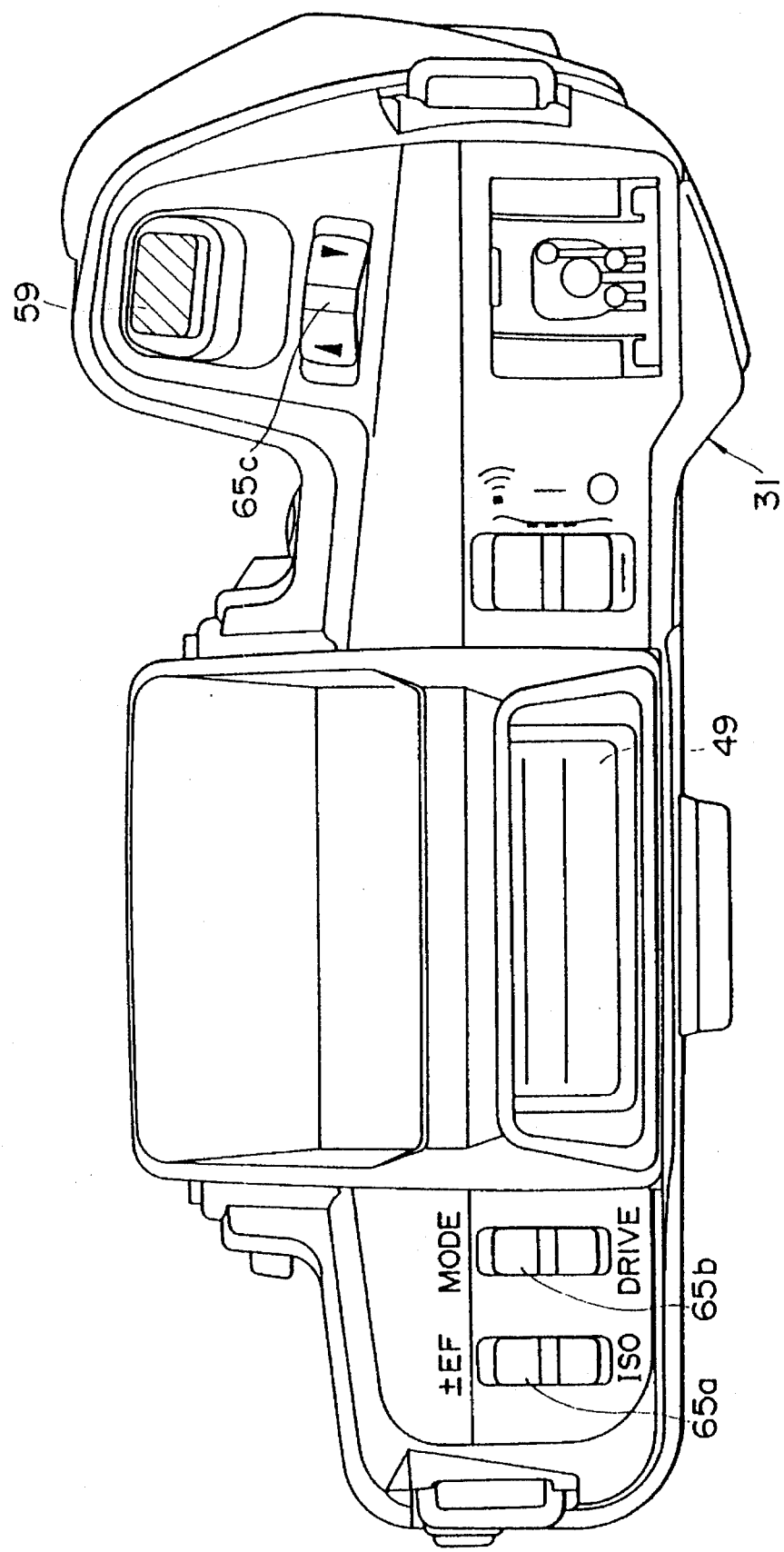
FIG. 1(F) is a view showing an operating unit incorporated in the camera of FIG. 1(A)

Explanation is now given for the operating unit 65 for specifying any change in the camera operation with reference to FIG. 1(F), which is a plan view of the camera body 31 shown in FIG. 1(A) as viewed in the direction indicated by "P" in the drawing. In this embodiment, the operating unit 65 includes the first switch 65a, the second switch 65b and the third switch 65c. Each switch can be set two different states other than the neutral state. The signal provided by the setting of each switch are read by the CPU 77. The first switch 65a specifies the exposure correction value (+/– EF) shift mode or the ISO value shift mode. The second switch 65b specifies the exposure value shift mode or the drive mode shift mode. The drive mode shift mode refers to the mode that can be set to any desired one of modes: single-frame advance photographing, consecutive advance photographing, self-timer, and auto-bracketing in consecutive advance photographing, according to this embodiment. The third switch 65e serves as a select switch for specifying which one of the settings should be selected in each shift mode specified by the first or the second switch. When the third switch 65c is pressed to ▲ or ▼, thus, multiple settings stored in the camera in advance are successively indicated on a display panel of the concentrated Indicator unit 49 and the setting standing when the third switch 65c stops is determined as the setting selected in the particular mode. Referring to the drive mode shift mode for example, when the second switch 65b is set to the drive mode shift mode and the third switch 65c is then pressed to ▲ or ▼, any one of single-frame advance photographing, consecutive advance photographing, self-timer, and auto-bracketing in consecutive advance photographing can be selected as desired by appropriate movement(s) of switch 65c. With the third switch 65c kept in operation until the display panel reveals that the desired setting has been reached, the signal indicative of the desired drive mode setting is transmitted from the IPU 71 to the CPU 77.

Figure 1G:
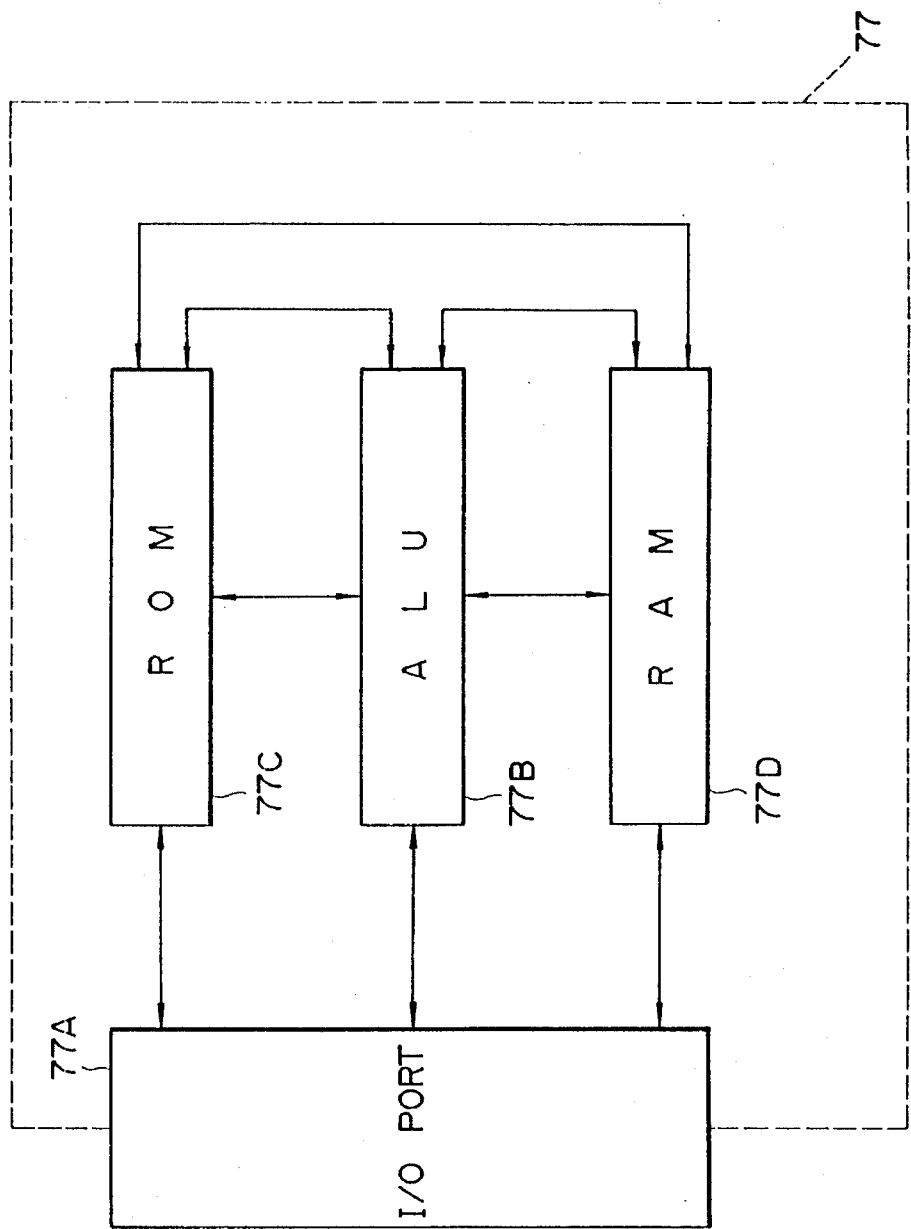
FIG. 1(G) is a block diagram of a control system employed in the camera of FIG. 1(A)

FIG. 1(G) is a block diagram of showing the configuration of the CPU 77. Numeral 77A indicates an I/O port for electrically connecting the CPU 77 to each unit of the camera. 77B indicates an ALU(Arithmetic Logic Unit) for executing calculating operation in accordance with programs, stored in ROM(Read Only Memory) described later. 77C indicates ROM storing the programms and desired constant values, further 77D indicates RAM(Random Access Memory) for temporarily storing the result of the calculating operation executed by the ALU.

DESCRIPTION OF THE EMBODIMENT

A series of operations of the auto-bracketing system according to this embodiment will be finely described with referring to the flow chart shown in FIG. 2(A).

After the second switch 65b of the operating unit 65 and the select switch 65c are operated as described to place the camera in the auto bracketing mode as in step 201, in order to place the shutter button 59 is then depressed halfway and the port P6 of the CPU 77 is set to a low level, auto-focus and photometric operation starts. Here, the output signals from the first and second sensors 45a and 45b and the reference voltage Vs are all fed to the CPU 77 by way of the logarithm compression circuits and amplifiers and are A/D converted by means of the A/D converter provided in the CPU 77 (step 205). Now, brightness values for each of photometric zones to be measured is calculated from the A/D converted sensor output in the manner to be discussed in more detail below. Since brightness values can be calculated in the same procedure for the first and second sensor 45a and 45b, description is given only for the case of the first sensor 45a.

Assume now the current running through the first sensor 45a as $i_{PA}$, the output from the first sensor as 45a $V_{BEA}$, the reference voltage with the current $i_c$ corresponding to Ev 20 as Vs, and the output voltage with the sensor current $i_o$ as $V_{BE}$ (io), $V_{BEA}$ and $V_S$ are given by the following equations.

$$V_{BEA}=KT/q.\ln(i_{PA}/i_o)+V_{BE}(i_o)$$

$$V_S=KT/q.\ln(i_c/i_o)+B_{BE}(io)$$

where, K is the Boltzman constant and $K=1.3806\times10^{-23}$ (J/°K), q is the electric charge and $q=1.60219\times10^{-19}$(c), T is the absolute temperature, ln=log e.

Assume then the voltage obtained by amplifying the voltage $V_{BEA}$ from the first sensor 45a as $V_{BEA}$, and resistances required for amplifying as $R_1$ and $R_2$ (where $R_1$ is a resistance having a positive temperature coefficient), $V_{EVA}$ is given by the following equations.

$$\begin{aligned}V_{EVA} &= R_2/R_1 \cdot (V_S - V_{BEA}) \\ &= (R_2/R_1) \cdot (KT/q) \cdot \ln(i_c/i_{PA})\end{aligned}$$

When $i_p$ at Ev 1 is assumed to be $i_{po}$ here, the current flowing through the first sensor 45a at a certain brightness (Ev) is given by $i_{pA}=i_{po}\times2^{(Ev-1)}$ so that the current lc corresponding to Ev 20 is given by $i_c=i_{po}\times2^{(20-1)}$. Since $R_1$ is a resistance having a positive temperature coefficient, $R_1=R_3.T$ holds ($R_3$: constant value). $V_{EVA}$ is therefore given by the following equation.

$$\begin{aligned}V_{EVA} &= R_2/(R_3 \cdot T) \cdot (20 - Ev) \cdot KT/q \cdot \ln 2 \\ &= R_2 K \cdot \ln 2/(R_3 \cdot q) \cdot (20 - Ev) \\ &= C \cdot (20 - Ev)\end{aligned}$$

where $C=R_2.K.\ln 2/(R_3.q)$: constant value

Here C takes a constant value because it is independent of the temperature T.

$V_{EVA}$ is now to be subject to A/D conversion. Since $V_{EVA}$ is dependent on the reference voltage $V_S$ and the voltage $V_A$ fed to CPU 77 is dependent on the GND (ground) voltage as a reference voltage, the A/D conversion value for $V_{EVA}$ is given by subtracting the A/D conversion value for $V_s$ from the A/D conversion value for $V_{VA}$ ($V_{VA}=V_S+V_{EVA}$). Brightness values can be calculated by subtracting a constant correction value from the reciprocal of the resultant A/D conversion value $V_A$. The same procedure takes place for the second sensor 45b for calculation of brightness values (step 207). The brightness values given by the photometric output from the first sensor 45a is here represented by BVA and that by the second sensor by $B_{VB}$.

According to the invention, "n" exposure values are to be calculated in accordance with at least two of multiple brightness values received from the sensors. Since there are two sensors in this embodiment, thus providing two brightness values of $B_{VA}$ and $B_{VB}$, both of them are used to calculate "n" exposure values as to be described below. In this embodiment, "n" is assumed to be "5" to provide an example of five exposure variations.

At first, exposure values $E_{VA}$ and $E_{VB}$ are calculated by the following equation in dependence on the brightness values $B_{VA}$ and $B_{VB}$, the full-aperture metering correction values $M_{NDIA}$ for the first sensor 45a, $$(M_{NDIA}=M_{A1}+M_{A2}$$

where, $M_{A1}$: APEX value corresponding to the difference between the exposure measurement values at of the reference lens and the actual lens under the full-aperture condition $M_{A2}$: APEX value corresponding to the difference between the quantities of passing light of the reference lens and the actual lens) and the full aperture metering correction value $M_{NDIB}$ for the second sensor 45b, $$(M_{NDIB}=M_{B1}+M_{B2}$$

where, $M_{B1}$: APEX value corresponding to the difference between the exposure measurement values of the reference lens and the actual lens under the full-aperture condition $M_{B2}$: APEX value corresponding to the difference between the quantities of passing light of the reference lens and the actual lens) and the sum $S_{xv}$ of the film ISO values and the exposure factor $X_v$ preset in the camera (step 209).

$$E_{VA}=B_{VA}+M_{NDIA}+S_{xv}$$

$$E_{VB}=B_{VB}+M_{NDIB}+S_{xv}$$

Using the resultant exposure values $E_{VA}$ and $E_{VB}$, five different exposure values represented by $E_{v1}$ through $E_{v5}$ are given by the following equations (step 211).

$$E_{v1}=E_{VA}$$

$$E_{v2}=3E_{VA}/4+E_{VB}/4$$

$$E_{v3}=E_{VA}/2+E_{VB}/2$$

$$E_{v4}=E_{VA}/4+3E_{VB}/4$$

$$E_{v5}=E_{vB}$$

Exposure factors Av and Tv dependent on the abovementioned exposure values Ev1 to Ev5 are then determined in accordance with the given programmed AE diagram, for Instance, as shown in FIG. 2(B) (step 213). "Av" is an aperture value and "Tv" is a shutter-speed value. Those are as shown below and are represented by Evn=Tvn+Avn (where "n" is an integer from 1 to 5) for simplicity of explanation.

$$Ev1=Tv1+Av1$$

$$Ev2=Tv2+Av2$$

$$Ev3=Tv3+Av3$$

$$Ev4=Tv4+Av4$$

$$Ev5=Tv5+Av5$$

Those exposure factors Tvn and Avn are one by one stored in predermined addresses of RAM 77D.

Now Tv1 and Av1 are read by specifying the address "n" storing the exposure factors as n=1 (step 215). When a release switch is turned on, i.e., the shutter button 59 is fully depressed to turn on the second-stage switch 59b (to set P7 to low), the CPU 77 operates for driving the release magnet coil 83 and the EE magnet coil 84. The Avn of the aperture condition here depends on Avn such as Av1(steps 216 and 217). Subsequently, the front-shutter curtain runs (step 219), and after the shutter time represented by Tvn elapses (see step 221), the trailing-shutter curtain is allowed to run (step 223). The motor drive circuit 73f drives the sequence motor for wind-up of film (step 225). Since a five-stage exposure is assumed in this embodiment, it is examined if n=5 is established (step 227). If n<5 in this check, n=n+1 holds so that the processing is executed for exposure of the subsequent frame in the subsequent exposure condition (step 229). Processing in steps 217 to 229 is repeated until n=5 is reached. When the release switch is turned off before the number "n" reaches "5", the CPU 77 simultaneously ceases for driving the release magnet coil 83 and the EE magnet coil 84, and the wind-up operation of film is stopped. Upon n=5, the auto-bracketing is brought to an end, readying the camera for the start of subsequent photometric.

When the camera runs out of film or experiences any failure, the shooting operation stops to indicate running out: of film or like problem on the display panel of the concentrated indicator unit 49.

The present invention is not limited to the foregoing embodiment but can be carried out in different forms of embodiment to be described below.

The configuration of the operating unit 65, especially the switch configuration for starting the mode setting of stage exposure in consecutive advance photographing should not necessarily be that using the second switch 65b and the third switch 65c in the embodiment described, but can be any other configuration suitable for the design of the camera.

While also the foregoing embodiment refers to two photometric sensors, it is naturally possible to provide three or more photometric sensors so as to use at least two of the brightness values obtained in accordance with the data from those multiple sensors. In this case, it may be considered that one of the two brightness values is the average value, the minimum value or the maximum value. It may be further considered that the two brightness values are both determined in accordance with a plurality of metered brightness.

In carrying out the present invention, the two brightness values should preferably be the minimum and maximum values of the plural brightness values. Also, the procedure for calculating "n" different exposure values in dependence on the two brightness values here includes not only calculating "n" exposure values within the range between the exposure value Evmin determined by the minimum brightness value and the exposure value Evmax determined by the maximum brightness value but also, as shown in a flow chart of FIG. 2(C), calculating "n" exposure values in another range wider than the range between Evmax and Evmin by a predetermined degree. There may be different methods to calculate exposure values In a range wider than the Evmax to Evmin range by a certain degree. One example of such methods is calculating ΔEvx from ΔEvx=( Evmax–Evmin) / m (where m is an arbitrary positive integer) and subtracting ΔEvx from Evmin or adding ΔEvx to Evmax. When expanding the range as mentioned, the degree of expansion may be determined in dependence on the nature of design adopted.

Further using the maximum and minimum values basically, if they are likely to cause overexpose or underexpose, an additional processing may preferable be provided to eliminate such extreme conditions, as shown in a flow chart of FIG. 2(D). Step 214 and 214-1 are the steps for the above processings, and step 227 (see FIG. 2 D-a) differs from that of the preceeding embodiments. At step 214, it is determined whether each Evn is between two preset values, i.e., within a predetermined range; and, at step 214-1, each Evn value which is outside of the range is deleted. In step 227, rather than having n=5 (with a five stage exposure), n=N (a predetermined number of exposure stages) is used to continue executing processing for exposure of a subsequent frame.

What is claimed is:

1. An auto-bracketing system for performing exposure variations with a camera, said camera having a light measuring circuit that includes a plurality of sensors for metering a plurality of brightnesses, and a film compartment adapted to receive a film roll therein, said roll of film having a plurality of successively arranged frames, said system comprising:

means for determining at least two exposure values, each said exposure value being determined in accordance with at least one brightness metered by at least one of said plurality of sensors;

means for calculating plurality of frame exposure values, said plurality of frame exposure values including said at least two determined exposure values, and at least one additional frame exposure value that is different from each of said at least two determined exposure values, each of said additional frame exposure values being determined as a function of both of said at least two determined exposure values;

means for exposing each of a plurality of successively arranged frames of said roll of film in accordance with respective ones of said plurality of calculated frame exposure values; and means for advancing said roll of film by one frame for each exposure value to be executed by said exposing means so that each frame is exposed using a different one of said plurality of calculated frame exposure values, wherein one of said at least two determined exposure values corresponding to brightnesses metered by said light measuring circuit comprises an average value of said brightnesses measured by said light measuring circuit.

2. The auto-bracketing system according to claim 1, wherein one of said at least two determined exposure values corresponding to brightnesses metered by said light measuring circuit comprises a minimum value of said brightnesses measured by said light measuring circuit.

3. The auto-bracketing system according to claim 1, wherein one of said at least two determined exposure values corresponding to brightnesses metered by said light measuring circuit comprises a maximum value of said brightnesses measured by said light measuring circuit.

4. An auto-bracketing system for performing exposure variations with a camera, said camera having a light measuring circuit that includes a plurality of sensors for metering a plurality of brightnesses, and a film compartment adapted to receive a roll of film therein, said roll of film having a plurality of successively arranged frames, said system comprising:

means for determining at exposure values, each said exposure value being determined in accordance with at least one brightness metered by at least one of said plurality of sensors;

means for calculating a plurality of frame exposure values, said plurality of frame exposure values including said at least two determined exposure values, and at least one additional frame exposure value that is different from each of said at least two determined exposure values, each of said additional frame exposure values being determined as a function of both of said at least two determined exposure values;

means for exposing each of a plurality of successively arranged frames of said roll of film in accordance with respective ones of said plurality of calculated frame exposure values; and means for advancing said roll of film by one frame for each exposure value to be executed by said exposing means so that each frame is exposed using a different one of said plurality of calculated frame exposure values, wherein at least one of said at least two determined exposure values is determined in accordance with a plurality of brightnesses metered by said light measuring circuit.

5. The auto-bracketing system according to claim 4, further comprising means for controlling said film advancing means so as to cease said advancing of said roll of film when a number of frames advanced by said film advancing means reaches the number of frame exposure values calculated by said frame exposure value calculating means.

6. The auto-bracketing system according to claim 4, further comprising means for controlling said film advancing means, said controlling means having a switch member for controlling said film advancing means so as to advance said roll of film when said switch member is ON, while ceasing said advancement of said roll of film when said switch member is OFF.

7. The auto-bracketing system according to claim 4, further comprising means for examining whether said frame exposure values calculated by said frame exposure value calculating means are included within an area bounded by two predetermined values; and means for inhibiting said exposing of said frames of said roll of film if said frame exposure value examined by said examining means is out of said area.

8. The auto-bracketing system according to claim 4, each of values and said exposure being defined by an equation:

$$Ev=Av+Tv;$$

where, Ev equals a frame exposure value;

Av equals an aperture value; and

Tv equals a shutter-speed value.

9. An auto-bracketing system for performing exposure variations with a camera, said camera having a light measuring circuit that includes a plurality of sensors for metering a plurality of brightnesses, and a film compartment adapted to receive a film of roll therein, said roll of film having a plurality of successively arranged frames, said system comprising:

means for determining at least two exposure values, each said exposure value being determined in accordance with at least one brightness metered by at least one of said plurality of sensors;

means for calculating a plurality of frame exposure values, said plurality of frame exposure values including said at least two determined exposure values, and at least one additional frame exposure value that is different from each of said at least two determined exposure values, each of said additional frame exposure values being determined as a function of both of said at least two determined exposure values;

means for exposing each of a plurality of successively arranged frames of said roll of film in accordance with respective ones of said plurality of calculated frame exposure values; and means for advancing said roll of film by one frame for each exposure value to be executed by said exposing means so that each frame is exposed using a different one of said plurality of calculated frame exposure values, wherein said at least two determined exposure values are determined in accordance with a plurality of brightnesses metered by said light measuring circuit.

10. An auto-bracketing system for performing exposure variations with a camera, said camera having a light measuring circuit that includes a plurality of sensors, said system comprising:

a film compartment that is associated with said camera, said film compartment comprising means for receiving a roll of film, said roll of film having a plurality of successively arranged frames;

means for determining at least two exposure values that correspond to at least two brightnesses metered by said plurality of sensors of said light measuring circuit, wherein one of said at least two determined exposure values comprises an average value of said brightnesses measured by said light measuring circuit;

means for calculating a plurality of frame exposure values that include said at least two exposure values;

means for exposing said frames of said roll of film in accordance with said calculated plurality of frame exposure values; and means for advancing said roll of film by one frame for each exposure value to be executed by said exposing means so that each frame is exposed using a different one of said plurality of frame exposure values.

11. The auto-bracketing system according to claim 10, wherein one of said at least two determined exposure values, which corresponds to brightnesses metered by said light measuring circuit, comprises a minimum value of said brightnesses measured by said light measuring circuit.

12. The auto-bracketing system according to claim 10, wherein one of at least said two determined exposure values, which correspond to brightnesses measured by said light measuring circuit, comprises a maximum value of said brightnesses measured by said light measuring circuit.

13. The auto-bracketing system according to claim 10, wherein a number of said calculated frame exposure values is greater than a number of said at least two determined exposure values.

14. The auto-bracketing system according to claim 10, wherein an exposure range of said calculated frame exposure values is greater than a range of said at least two determined exposure values.

15. An auto-bracketing system for performing exposure variations with a camera, said camera having a light measuring circuit that includes a plurality of sensors, said system comprising:

a film compartment that is associated with said camera, said film compartment comprising means for receiving a roll of film having a plurality of successively arranged frames;

means for determining at least two exposure values that correspond to at least two brightnesses metered by said plurality of sensors of said light measuring circuit, at least one of said two determined exposure values being determined in accordance with a plurality of brightnesses metered by said light measuring circuit;

means for calculating a plurality of frame exposure values that include said at least two exposure values;

means for exposing said frames of said roll of film in accordance with said calculated plurality of frame exposure values; and means for advancing said roll of film by one frame for each exposure value to be executed by said exposing means so that each frame is exposed using a different one of said plurality of frame exposure values.

16. The auto-bracketing system according to claim 15, wherein a number of said plurality of calculated frame exposure values is greater than a number of said plurality of determined exposure values.

17. The auto-bracketing system according to claim 15, wherein an exposure range of said plurality of frame exposure values is greater than a range of said at least two determined exposure values.

18. An auto-bracketing system for performing exposure variations with a camera, said camera having a light measuring circuit that includes a plurality of sensors, said system comprising:

a film compartment associated with said camera, said film comprising means for receiving a roll of film having a plurality of successively arranged frames;

means for determining at least two exposure values that correspond to at least two brightnesses metered by said plurality of sensors of said light measuring circuit, said at least two determined exposure values being determined in accordance with a plurality of brightnesses metered by said light measuring circuit;

means for calculating a plurality of frame exposure values that include said at least two exposure values;

means for exposing said frames of said roll of film, in accordance with said calculated plurality of frame exposure values; and means for advancing said roll of film by one frame for each exposure value to be executed by said exposing means so that each frames exposed using a different one of said plurality of frame exposure values.

19. An auto-bracketing system in a camera for sequentially exposing a plurality of frames of film, said system comprising:

a photometry circuit including a first photometry sensor and a second photomerry sensor;

means for calculating a first exposure value and a second exposure value, said first exposure value being calculated in accordance with brightness values measured by said first sensor, said second exposure value being calculated in accordance with brightness values measured by said second sensor;

means for determining five frame exposure values, a first one of said five frame exposure values comprising said first exposure value, and a second one of said five frame exposure values comprising said second exposure value, wherein third, fourth and fifth frame exposure values of said five frame exposure values are calculated based on said first and second exposure values; and means for sequentially exposing five of said film frames, each of said five film frames being exposed using a different one of said five frame exposure values.

20. The auto-bracketing system according to claim 19, wherein said third, fourth and fifth frame exposure values are between said first and second exposure values.

21. The auto-bracketing system according to claim 20, wherein said third, fourth and fifth frame exposure values are uniformly spaced between said first and second exposure values.

22. The auto-bracketing system according to claim 19, wherein said third frame exposure value has a value which is between the values of said first and second exposure values, said fourth frame exposure value has a value which is larger than a larger of said first and second exposure values, and said fifth frame exposure value has a value which is smaller than a smaller of said first and second exposure values.

23. The auto-bracketing system according to claim 22, wherein said five frame exposure values are uniformly spaced.

24. The auto-bracketing system according to claim 19 wherein at least one of said third, fourth and fifth frame exposure values is determined by summing said first exposure value, as modified by a predetermined weighting factor, with said second exposure value, as modified by a predetermined weighting factor.

25. An auto-bracketing system in a camera for sequentially exposing a plurality of frames of film, said system comprising:

a photometry circuit including a plurality of photometry sensors for measuring brightness;

means for calculating a first exposure value and a second exposure value, said first exposure value being calculated in accordance with one brightness value measured by said plurality of sensors, said second exposure value being calculated in accordance with another brightness value measured by said plurality of sensors;

means for determining five frame exposure values, a first one of said five frame exposure values comprising said first exposure value, and a second one of said five frame exposure values comprising said second exposure value, wherein third, fourth and fifth frame exposure values of said five frame exposure values are calculated based on said first and second exposure values; and means for sequentially exposing five of said film frames, each of said five film frames being exposed using a different one of said five frame exposure values.

26. The auto-bracketing system according to claim 25, wherein said third, fourth and fifth frame exposure values are between said first and second exposure values.

27. The auto-bracketing system according to claim 26, wherein said third, fourth and fifth frame exposure values are uniformly spaced between said first and second exposure values.

28. The auto-bracketing system according to claim 25, wherein said third frame exposure value has a value which is between the values of said first and second exposure values, said fourth frame exposure value has a value which is larger than a larger of said first and second exposure values, and said fifth frame exposure value has a value which is smaller than a smaller of said first and second exposure values.

29. The auto-bracketing system according to claim 28, wherein said five frame exposure values are uniformly spaced.

30. The auto-bracketing system according to claim 25, wherein at least one of said third, fourth and fifth frame exposure values is determined by summing said first exposure value, as modified by a predetermined weighting factor, with said second exposure value, as modified by a predetermined weighting factor.

31. An auto-bracketing system in a camera for sequentially exposing a plurality of frames of film, said system comprising:

a photometry circuit including a first photometry sensor and a second photometry sensor;

means for calculating a first exposure value and a second exposure value, said first exposure value being calculated in accordance with brightness values measured by said first sensor, said second exposure value being calculated in accordance with brightness values measured by said second sensor;

means for determining a plurality of frame exposure values, a first one of said plurality of frame exposure values comprising said first exposure value, and a second one of said plurality of frame exposure values comprising said second exposure value, and wherein at least one frame exposure value of said plurality of frame exposure values is calculated based on said first and second exposure values; and means for sequentially exposing a plurality of said film frames, each of said plurality of film frames being exposed using a different one of said plurality of frame exposure values.

32. The auto-bracketing system according to claim 31, wherein said at least one frame exposure value is between said first and second exposure values.

33. The auto-bracketing system according to claim 31, wherein said at least one frame exposure value is uniformly spaced between said first and second exposure values.

34. The auto-bracketing system according to claim 31, wherein said at least one frame exposure value has a value which is between the values of said first and second exposure values, and at least one additional frame exposure value has a value which is larger than a larger of said first and second exposure values or is smaller than a smaller of said first and second exposure values.

35. The auto-bracketing system according to claim 31, wherein said at least one frame exposure value is determined by summing said first exposure value, as modified by a predetermined weighting factor, with said second exposure value, as modified by a predetermined weighting factor.

* * * * *

UNITED STATES PATENT AND TRADEMARK OFFICE
CERTIFICATE OF CORRECTION

PATENT NO. : 5,508,779
DATED : April 16, 1996
INVENTOR(S) : O. SATOU et al.

It is certified that error appears in the above-indentified patent and that said Letters Patent is hereby corrected as shown below:

At column 9, line 2 (claim 1, line 5), change "a film roll" to ---a roll of film---.

At column 9, line 47 (claim 4, line 8), before "exposure" insert ---least two---.

At column 10, line 26 (claim 8, line 2), before "values" insert ---said frame exposure---.

At column 10, line 26 (claim 8, line 2), delete "and said exposure".

At column 10, line 37 (claim 9, line 5), change "film of roll" to ---roll of film---.

At column 12, line 7 (claim 18, line 5), after "film" (second occurrence) insert ---compartment---.

Signed and Sealed this

Seventeenth Day of December, 1996

Attest:

BRUCE LEHMAN

*Attesting Officer*    *Commissioner of Patents and Trademarks*